US012100900B2

(12) United States Patent
Surikov et al.

(10) Patent No.: US 12,100,900 B2
(45) Date of Patent: Sep. 24, 2024

(54) INTEGRATED 5G AND GNSS COMPACT ANTENNA SYSTEM

(71) Applicant: Topcon Positioning Systems, Inc., Livermore, CA (US)

(72) Inventors: Vasiliy Valerievich Surikov, St. Petersburg (RU); Dmitry Vitalievich Tatarnikov, Moscow (RU); Stanislav Borisovich Glybovski, St. Petersburg (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 17/909,221

(22) PCT Filed: Mar. 3, 2022

(86) PCT No.: PCT/RU2022/000063

§ 371 (c)(1),
(2) Date: Sep. 2, 2022

(87) PCT Pub. No.: WO2023/167606

PCT Pub. Date: Sep. 7, 2023

(65) Prior Publication Data

US 2024/0222865 A1 Jul. 4, 2024

(51) Int. Cl.
*H01Q 5/20* (2015.01)
*H01Q 9/04* (2006.01)

(52) U.S. Cl.
CPC ............ *H01Q 5/20* (2015.01); *H01Q 9/0421* (2013.01); *H01Q 9/045* (2013.01)

(58) Field of Classification Search
CPC ........... H01Q 1/36; H01Q 1/286; H01Q 5/20; H01Q 5/385; H01Q 9/045; H01Q 9/0421; H01Q 9/265
See application file for complete search history.

(56) References Cited

U.S. PATENT DOCUMENTS

| | | | | |
|---|---|---|---|---|
| 8,159,403 | B1 * | 4/2012 | Chen | H01Q 21/205 343/705 |
| 9,698,472 | B2 * | 7/2017 | Miškovský | H01Q 9/40 |
| 10,263,345 | B2 * | 4/2019 | Ng | H01Q 21/30 |
| 11,349,201 | B1 * | 5/2022 | Parrow | H01Q 1/281 |
| 2015/0071137 | A1 * | 3/2015 | Thiam | H01Q 1/521 343/702 |
| 2022/0158325 | A1 * | 5/2022 | Locke | H01Q 21/28 |

* cited by examiner

*Primary Examiner* — Tung X Le
(74) *Attorney, Agent, or Firm* — Bardmesser Law Group

(57) ABSTRACT

An integrated compact radio antenna system for receiving and transmitting 5G signals and receiving GNSS signals is described. The system comprises a high-precision GNSS antenna and a MIMO 5G multi-element antenna system. All the antennas within the proposed compact system are integrated with a shielded housing that enables electronic components of GNSS receiver and 5G modem to be arranged inside. The proposed integrated system has the following advantages: 1) compactness, 2) high efficiency of MIMO 5G antenna system, 3) a high degree of decoupling between 5G antennas, 4) a high degree of decoupling between 5G and GNSS antennas.

12 Claims, 19 Drawing Sheets

INTEGRATED 5G AND GNSS COMPACT ANTENNA SYSTEM

BACKGROUND OF THE INVENTION

Field of the Invention

The present invention relates to wireless communications equipment, more particularly, to high-precision positioning equipment, and, more particularly, to an integrated compact system including a high-precision GNSS antenna and MIMO 5G communication antennas.

Background of the Related Art

Due to the rapid growth of the wireless communication industry, it has become necessary to equip high-precision positioning devices with communication systems possessing high data throughput and long-range multi-band communication. High throughput is required due to the need to transfer large amounts of data over a communication channel, for example, high-quality images. For this purpose, modern communication systems, such as LTE and 5G, provide simultaneous operation of several antenna elements at once, either in diversity reception mode or in Multiple Input Multiple Output (MIMO) mode, to form parallel spatial communication channels. In this case, each of the antenna elements is multi-band, which allows simultaneous communication at several frequencies (this is called Carrier Aggregation technology). The required number of antenna elements in 5G devices is typically 4 or more. The use of MIMO and Carrier Aggregation technologies allows increasing the data transfer rate in dense urban networks.

In addition, an important aspect of providing communication with the positioning device is its operational mode far from the base station, that is, in the conditions of intermittent reception. In this mode, to ensure the communication range, the antenna elements must have a high efficiency. The frequencies of the FR1 band of the 5G standard in most existing modems range from 600 to 6000 MHz, which means that the size of the positioning device is small compared to the wavelength, especially at lower frequencies. Achieving a wide bandwidth and high efficiency of antenna elements simultaneously in these conditions is a significant engineering challenge.

The solution to this problem can be chosen only as the best compromise between the efficiency and the level of matching of the communication antennas, and the degree of their mutual influence, that would allow meeting the requirements of the standard. In addition, since GNSS positioning uses frequencies that border the applicable terrestrial communication bands, then, when equipping a positioning device with communication antennas, there is a specific task of decoupling the GNSS receiving antenna and the LTE/5G transceiver antenna elements.

Most of LTE and 5G MIMO antennas reported in the literature are quite large. See, for example, CN213460109U, CN210006895U, CN211957898U, DE102013215363A1, CN106532243A, CN111129788A. Their direct use together with the housing of a positioning device with a GNSS antenna can significantly increase the total dimensions of the apparatus. The present invention proposes a new form of the housing for the positioning device with necessary electronic units, with the GNSS antenna and 5G antennas arranged inside it. In this solution, the housing is also a part of one of the transceiver antenna elements of the multi-element 5G antenna system responsible for communication in a low-frequency FR1 sub-band.

In addition, a method is proposed of arranging and feeding all the other MIMO 5G antenna elements. Due to the proposed technical solution, while the overall housing size is relatively small compared to the wavelength, both a high efficiency of the 5G low-frequency transceiver antenna element and its decoupling from the GNSS antenna are achieved. In addition, a method is proposed of arranging other antenna elements of the MIMO 5G system, with a high decoupling from GNSS antenna and a compromise matching level and efficiency. The system described in U.S. Pat. No. 8,842,045B2 can be considered a prototype of such a design.

A drawback of the design of U.S. Pat. No. 8,842,045B2 is the lack of a communication system with comparable dimensions. In particular, there is no possibility of arranging MIMO 5G antennas, which could provide long-range communication without increasing the overall dimensions when combined with a GNSS device. In the proposed GNSS-5G integrated system, a conical monopole radiator with a round flat screen is used as one of the MIMO antennas. There is a similar technical solution in the literature, for example, in [1], but the structure in [1] is not integrated with a high-precision GNSS antenna, and it also has the following drawback: there is no electric contact between the housing of the conical monopole and the metal disc covering it. However, this contact is required to arrange an integrated GNSS-5G radio system, since GNSS electronic elements and 5G modem should be placed inside a metal housing of the conical monopole, and the RF connectors of these devices should be attached to the GNSS and 5G antenna clamps.

Accordingly, there is a need in the art for an integrated GNSS and 5G antenna that addresses the drawbacks of the related art.

SUMMARY OF THE INVENTION

The present invention describes integration of a GNSS antenna and a MIMO 5G antenna into a single system, and a design variant of an integrated GNSS-5G system. According to the following, the proposed compact integrated GNSS-5G system has a receiving high-precision positioning GNSS antenna and a multi-element MIMO 5G antenna system, including, in particular, a transceiver broadband antenna element of low-frequency 5G standard in the form of a conical monopole, which also acts as a radio-frequency screen for the GNSS receiver electronic components and 5G modem. This design allows achieving a relatively small size of the housing, providing a high efficiency of a transceiver low-frequency 5G antenna and its high decoupling from the GNSS antenna.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 1*a*. FIG. 1*b* schematically shows a design of the proposed integrated system.

FIG. 2 shows in detail the design features of a shielded housing with electronics 200 combined with a transceiver 5G antenna element of low-frequency band, in the form of a conical monopole.

FIG. 3*a* shows an implementation of a 5G antenna element of low-frequency band in the form of a "petal" structure and embedded conical shielded housing with electronics.

FIGS. 3*b*-3*d* shows other possible designs for the housing with electronics.

FIG. 4 schematically depicts an alternative design of the integrated system, which differs from the one shown in FIGS. 1*a*, 1*b*, 2, as it has the opposite orientation of the conical monopole with respect to the vertical axis.

Figure 7:
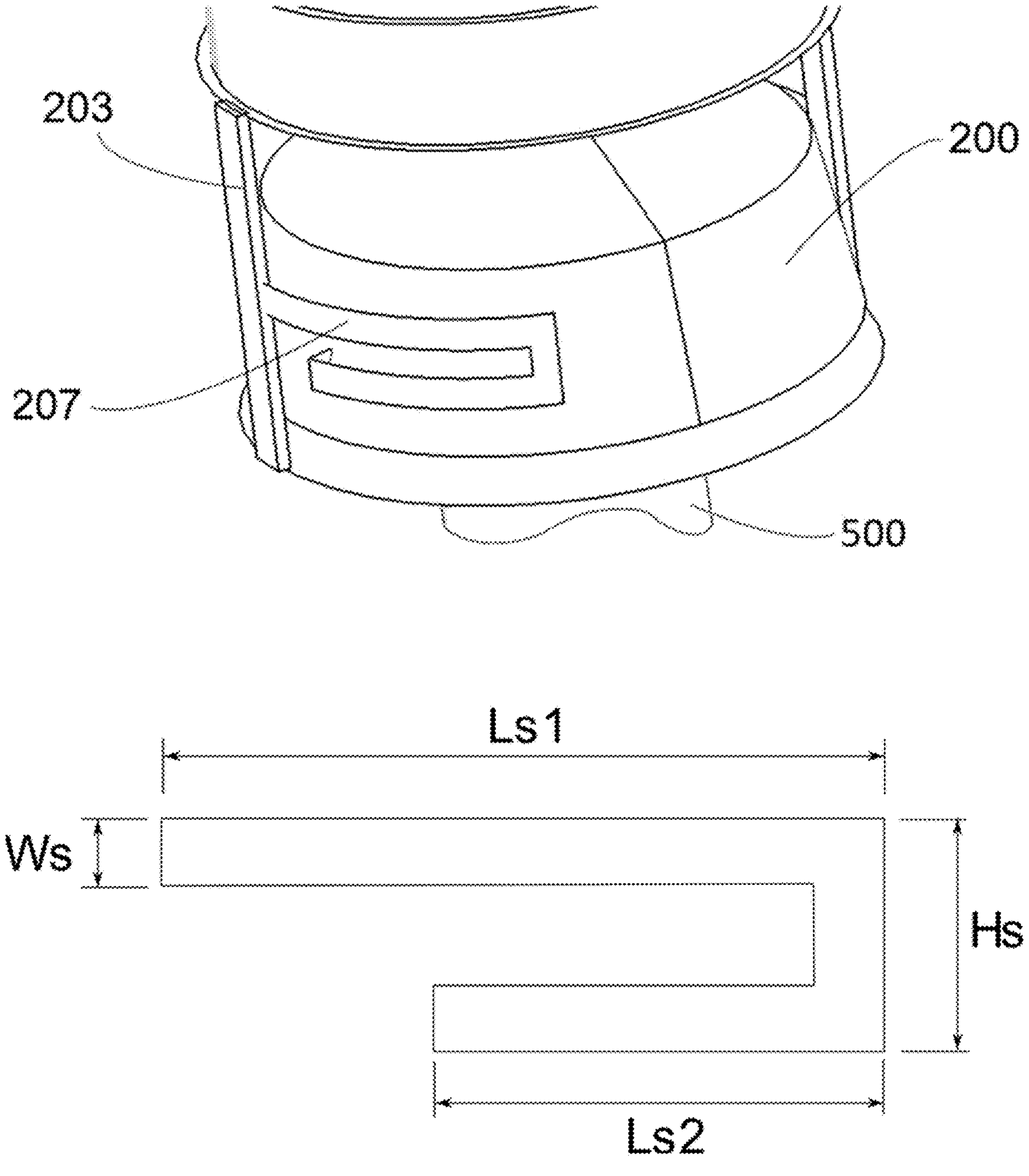

FIG. 7 schematically shows a metal stub connecting the metal rack and the housing with electronics.

Figure 8:
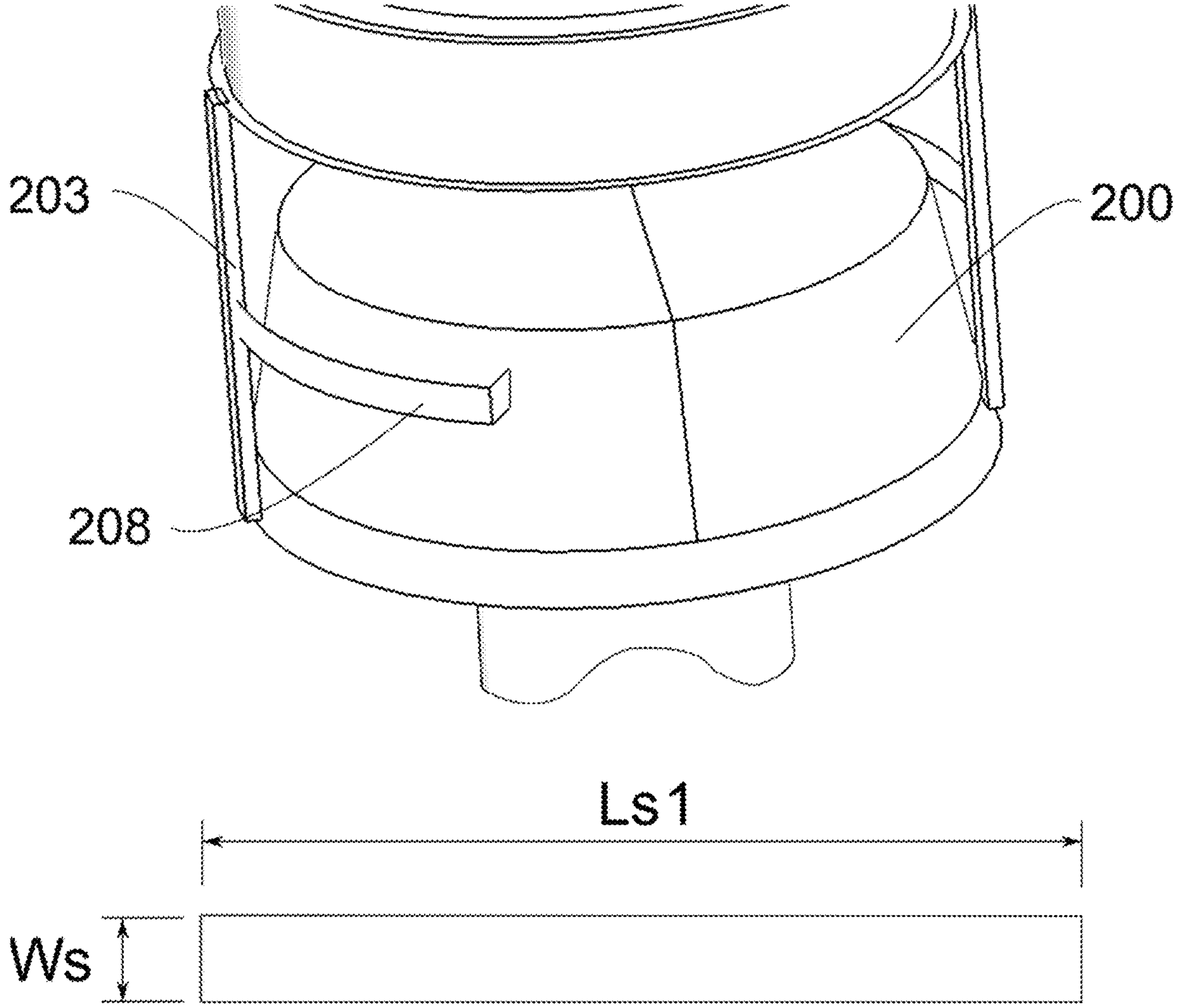

FIG. 8 schematically shows a metal stub connecting the metal rack and the housing.

Figure 9:
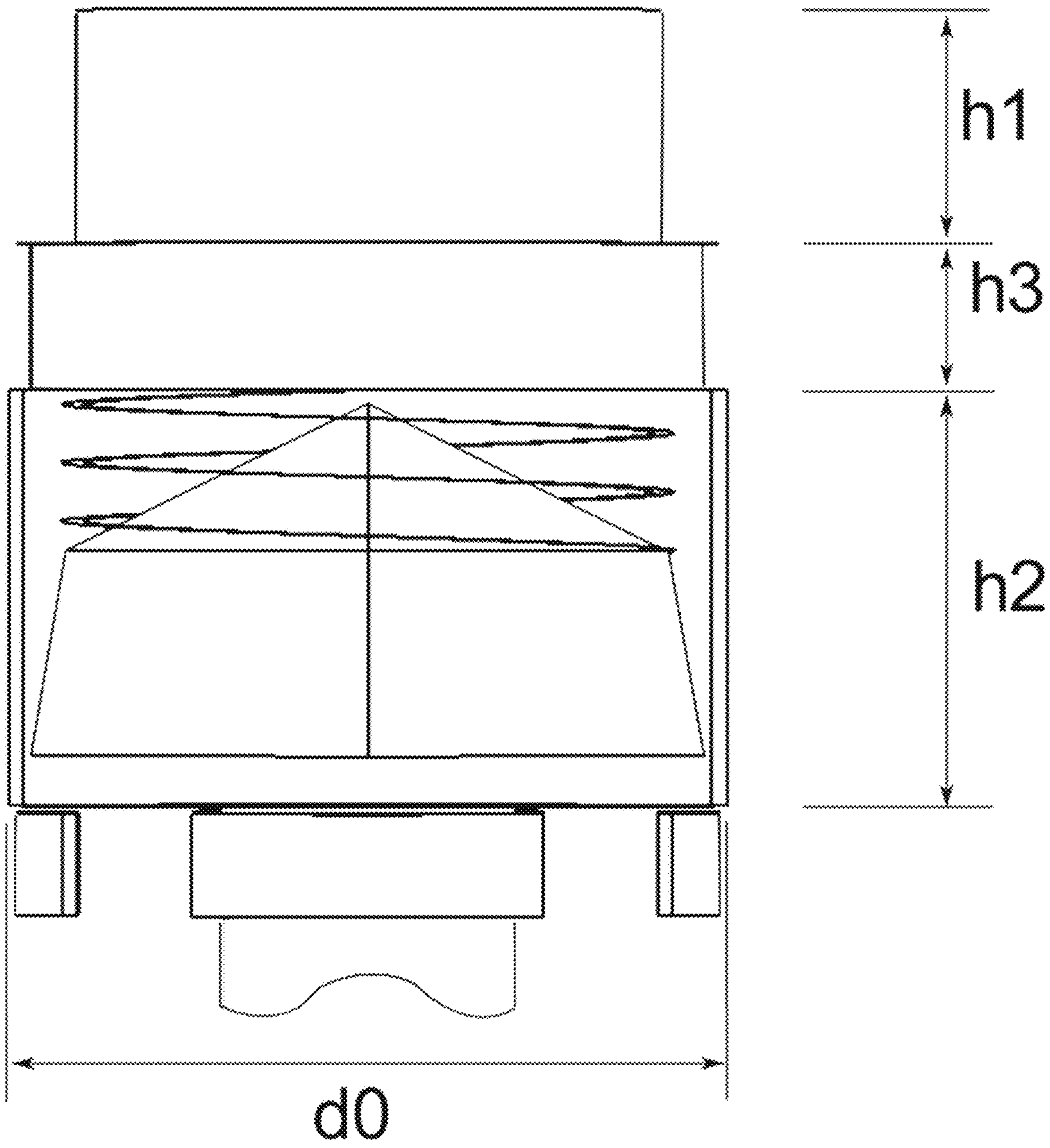

FIG. 9 shows exemplary characteristic dimensions of the integrated GNSS-5G antenna system.

Figure 1A:
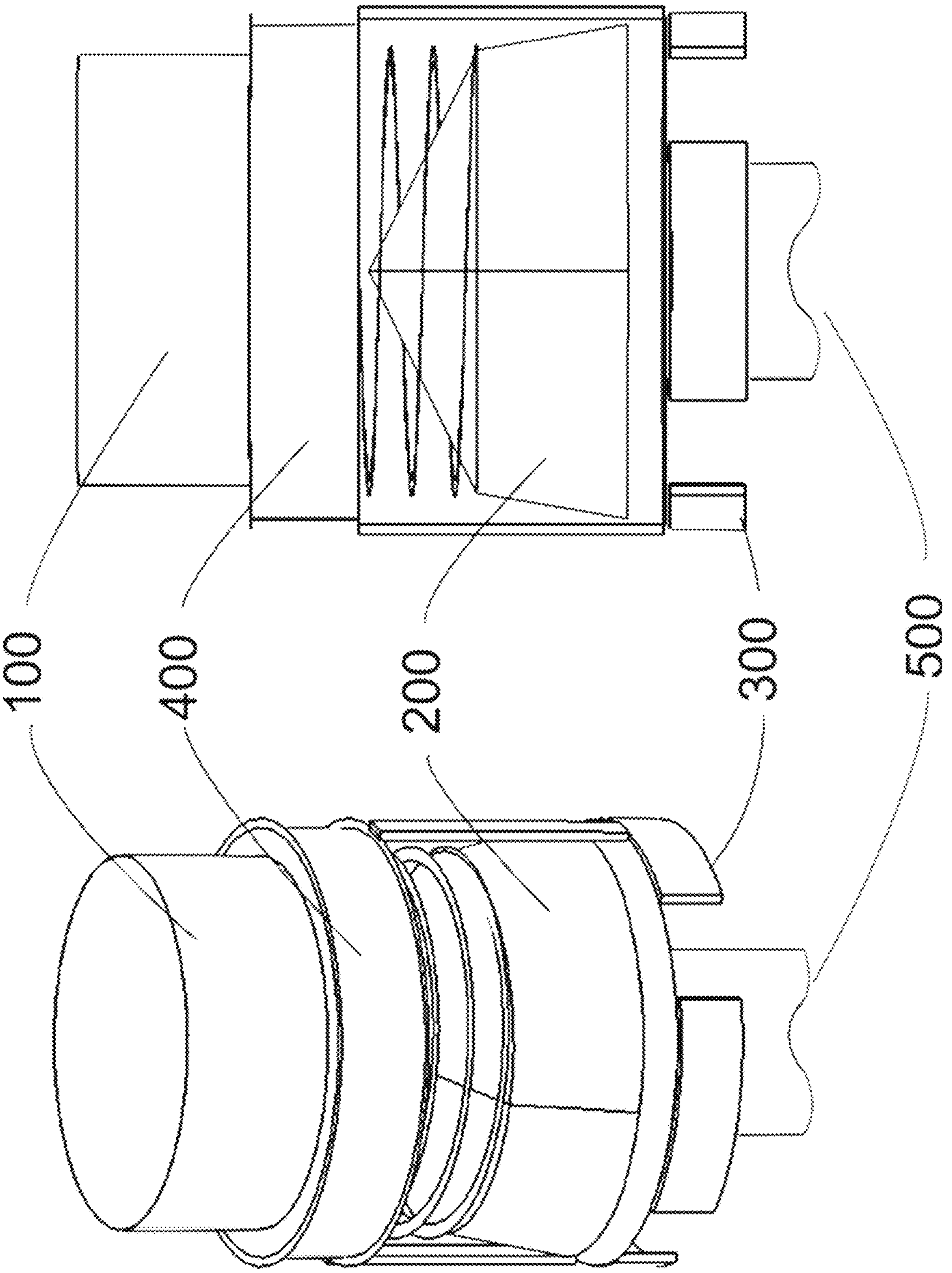
Figure 1B:
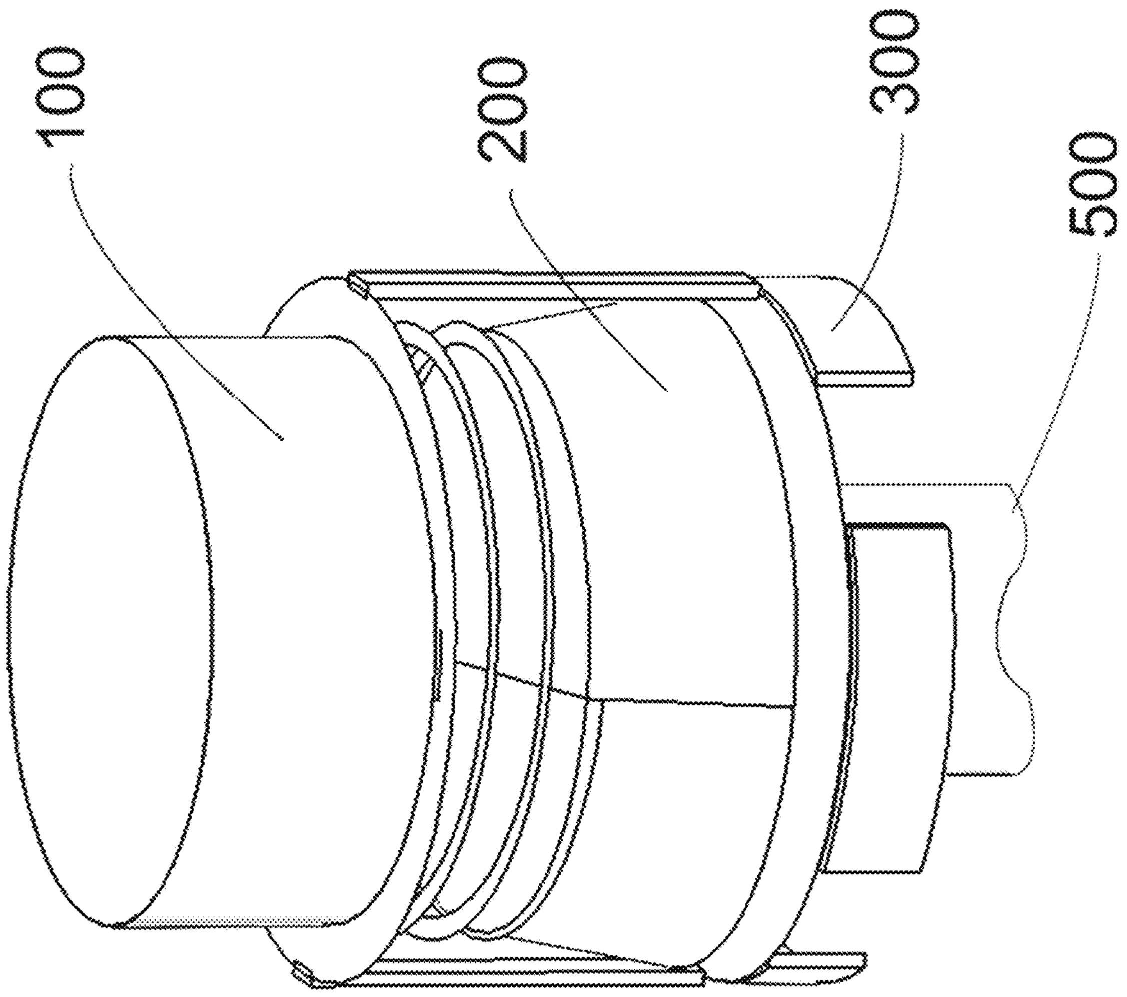
Figure 2:
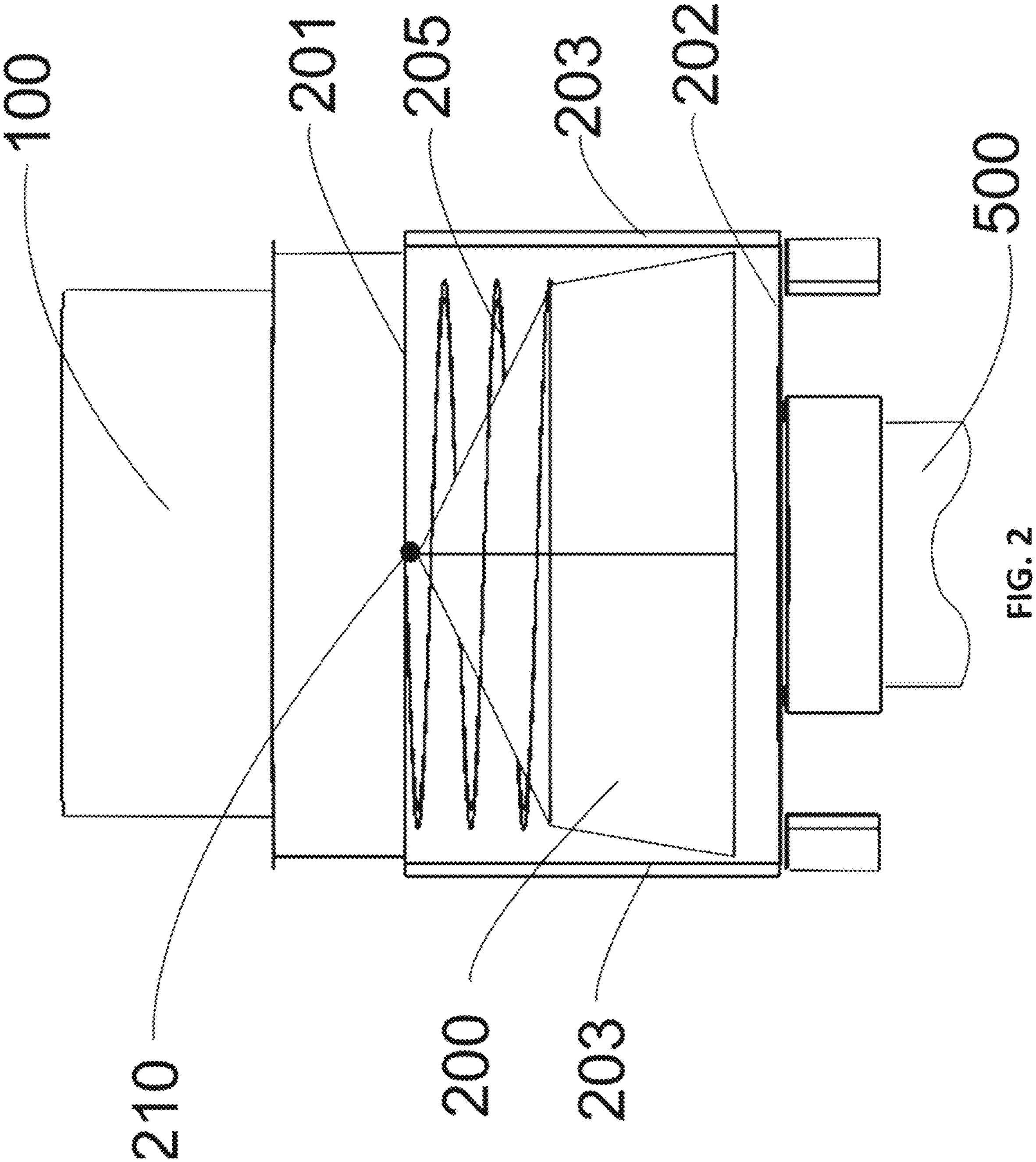
Figure 10:
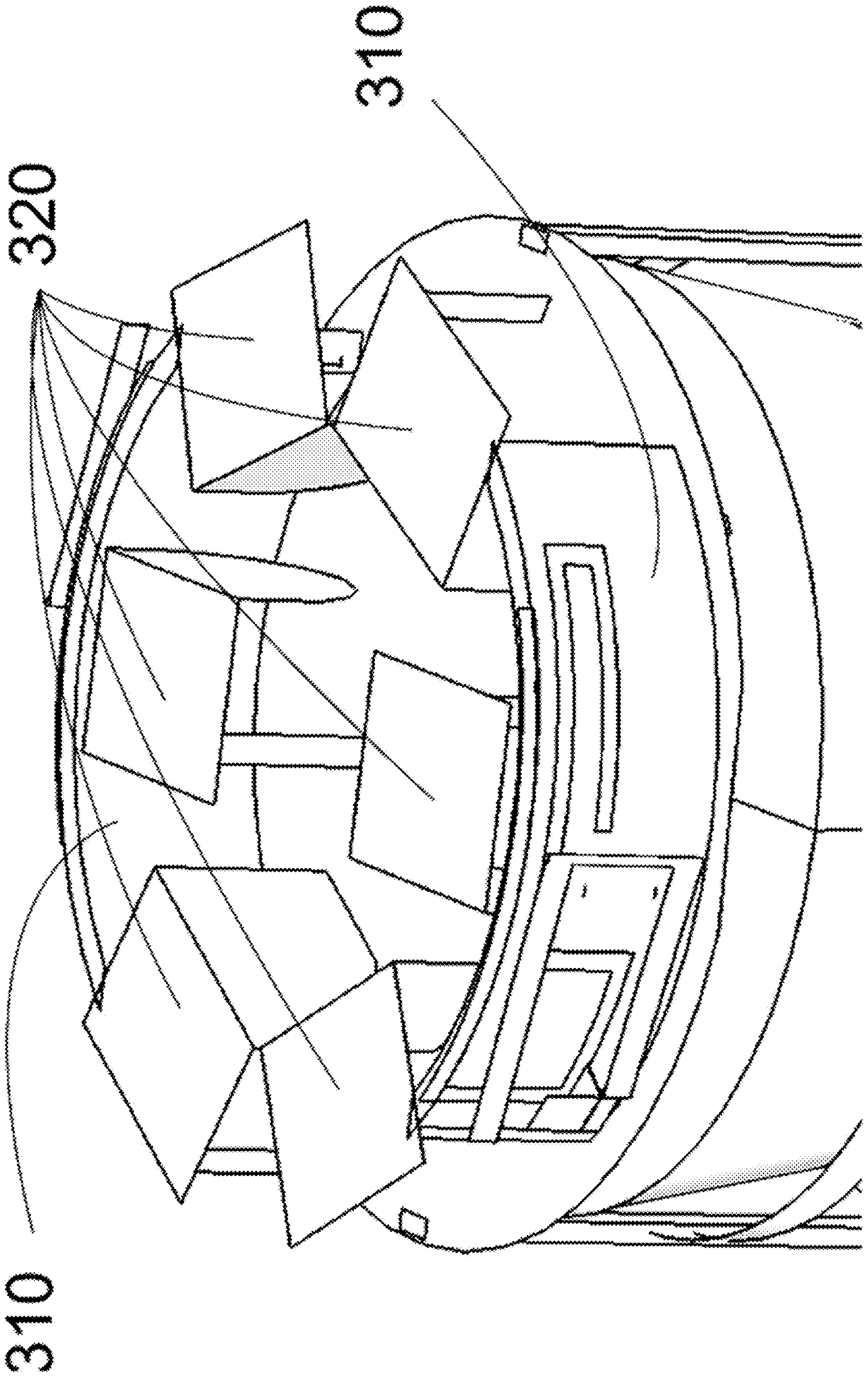

FIG. 10 shows a possible implementation of the 5G MIMO antenna elements that are schematically shown in FIGS. 1*a*, 1*b*, operating in various 5G bands in addition to the antenna element in the form of a conical monopole designed for the low-frequency band, oriented in accordance with FIGS. 1*a*, 1*b*, 2.

Figure 11:
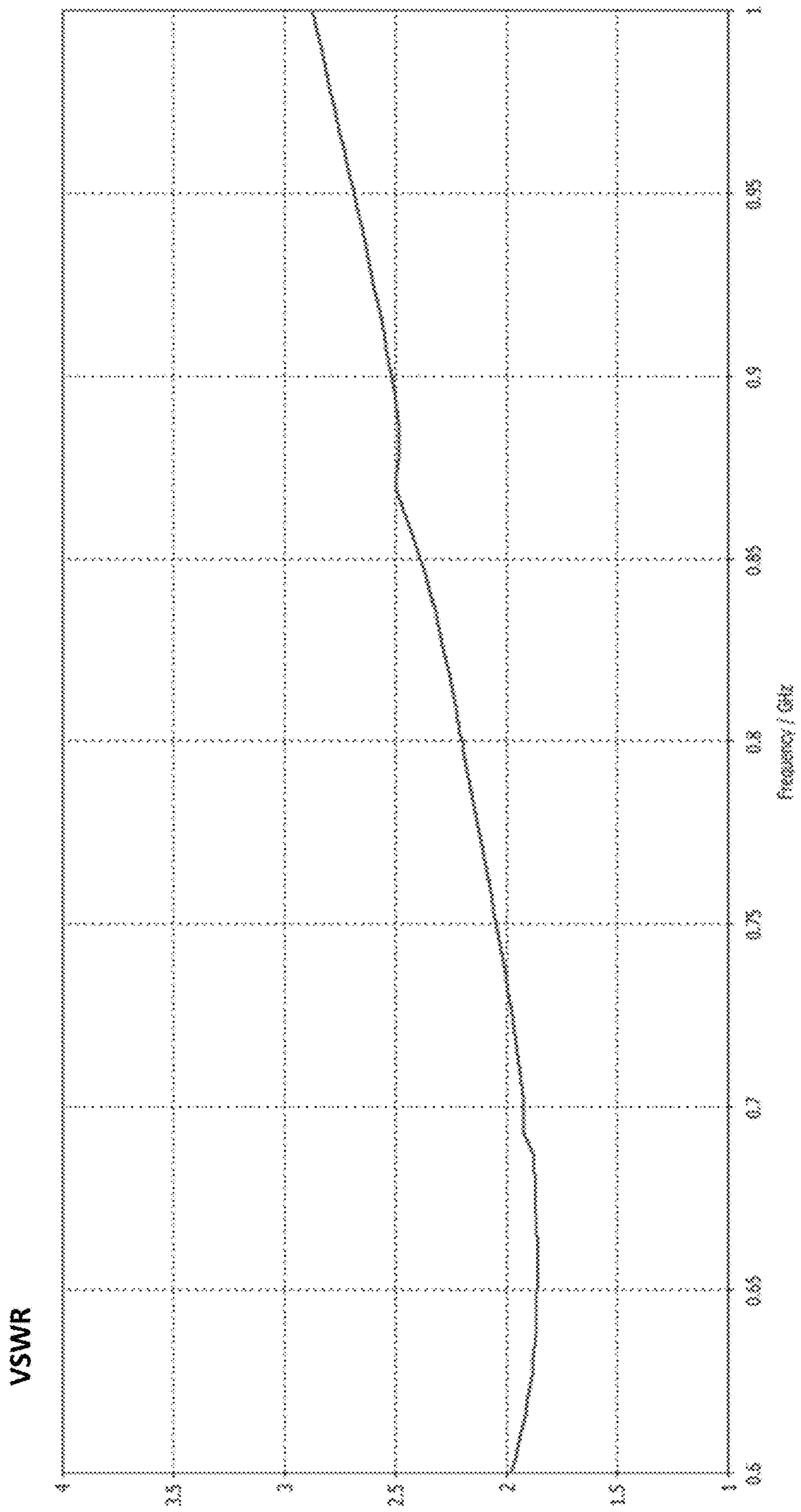

FIG. 11 shows the numerically calculated frequency dependence of the voltage standing wave ratio (VSWR) of a low-frequency 5G MIMO antenna element in the form of an integrated conical monopole oriented according to the FIGS. 1*a*, 1*b*, 2.

Figure 12:
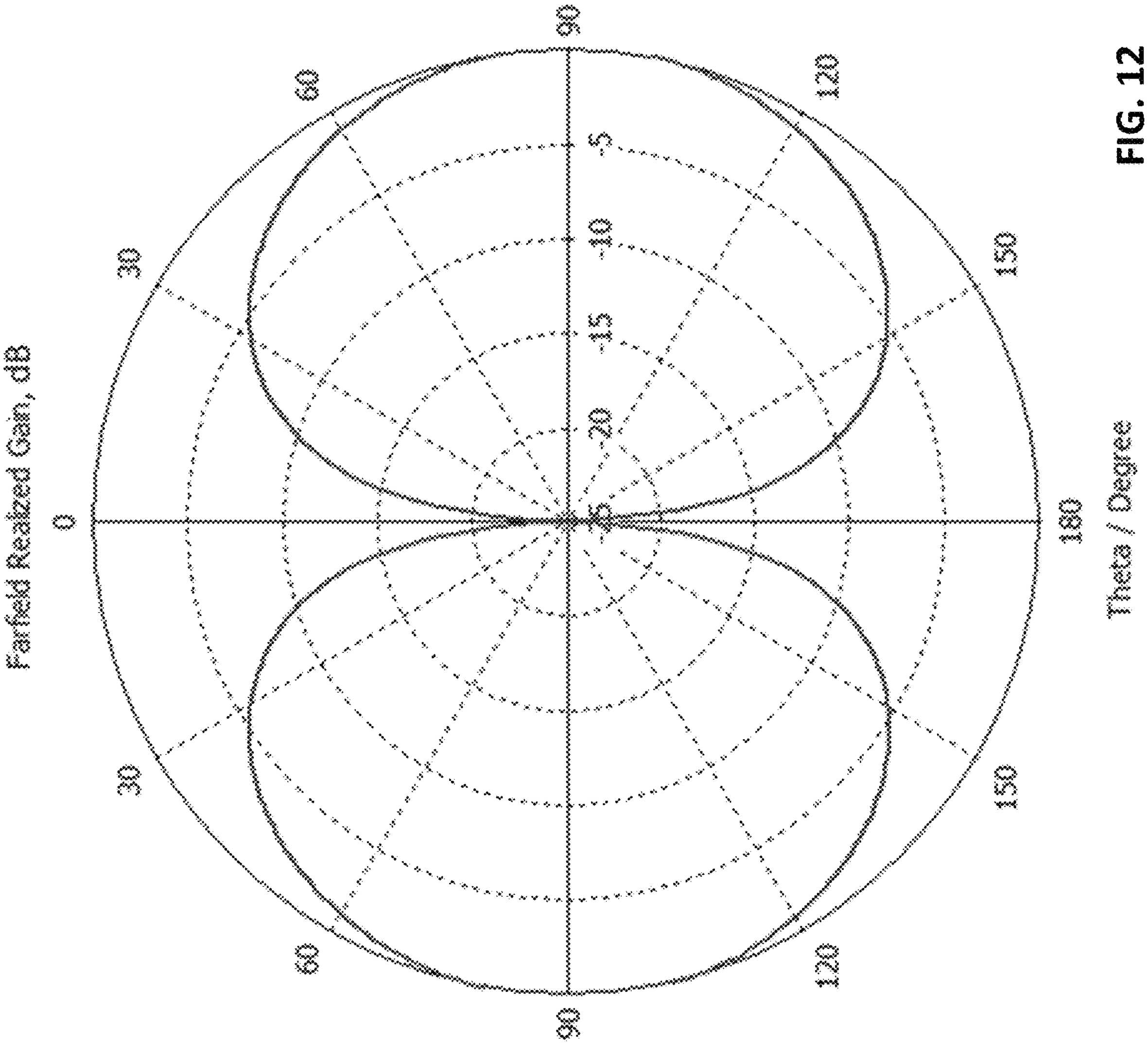

FIG. 12 shows the numerically calculated dependence of the gain of a low-frequency 5G MIMO antenna element in the form of an integrated conical monopole on the elevation angle at a frequency of 617 MHz, which is the lowest frequency of the 5G Band n71.

Figure 13:
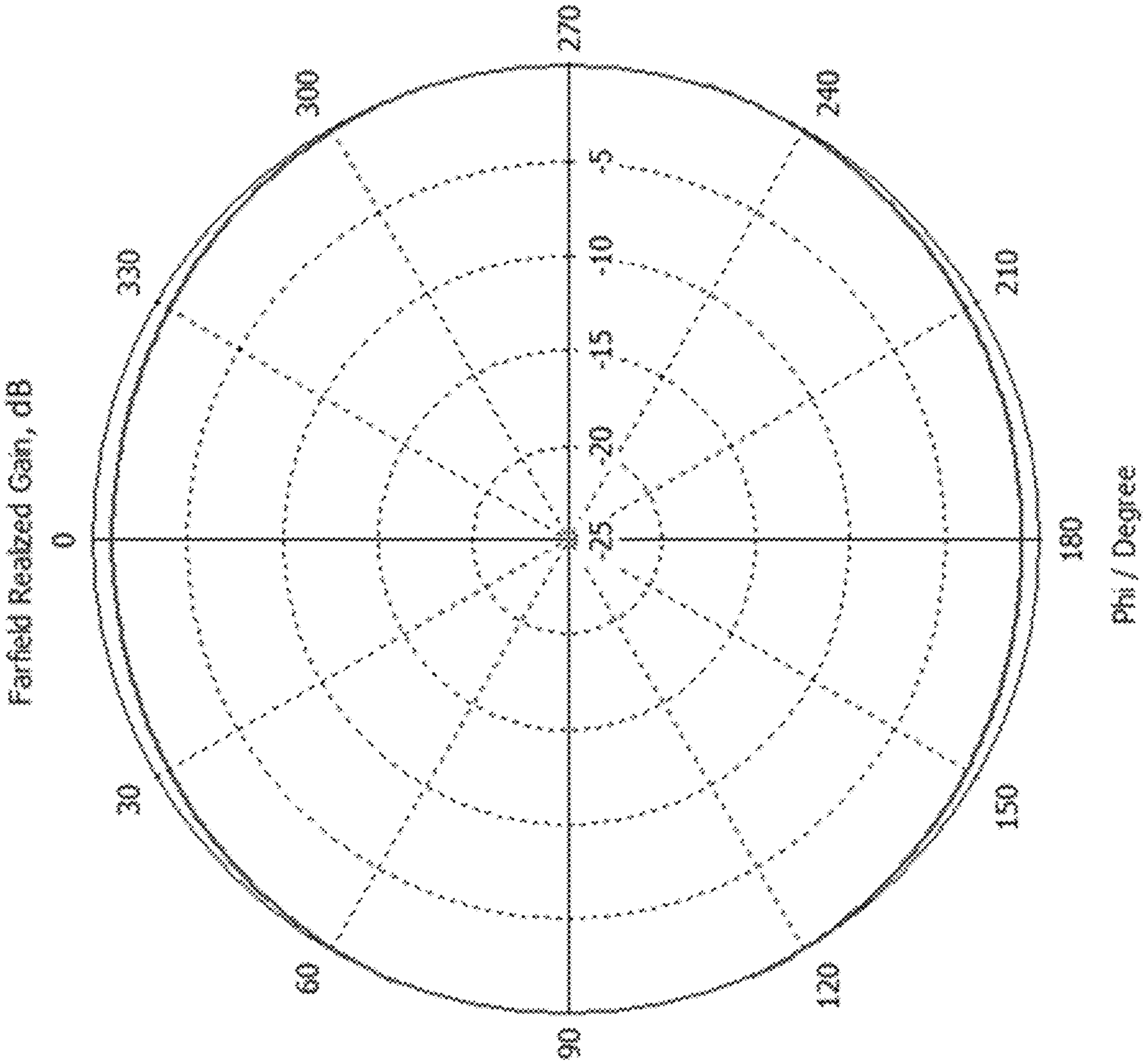

FIG. 13 shows the numerically calculated dependence of the gain of a low-frequency 5G MIMO antenna element in the form of an integrated conical monopole on the azimuth angle at a frequency of 617 MHz, which is the lowest frequency of the 5G Band n71.

Figure 14:
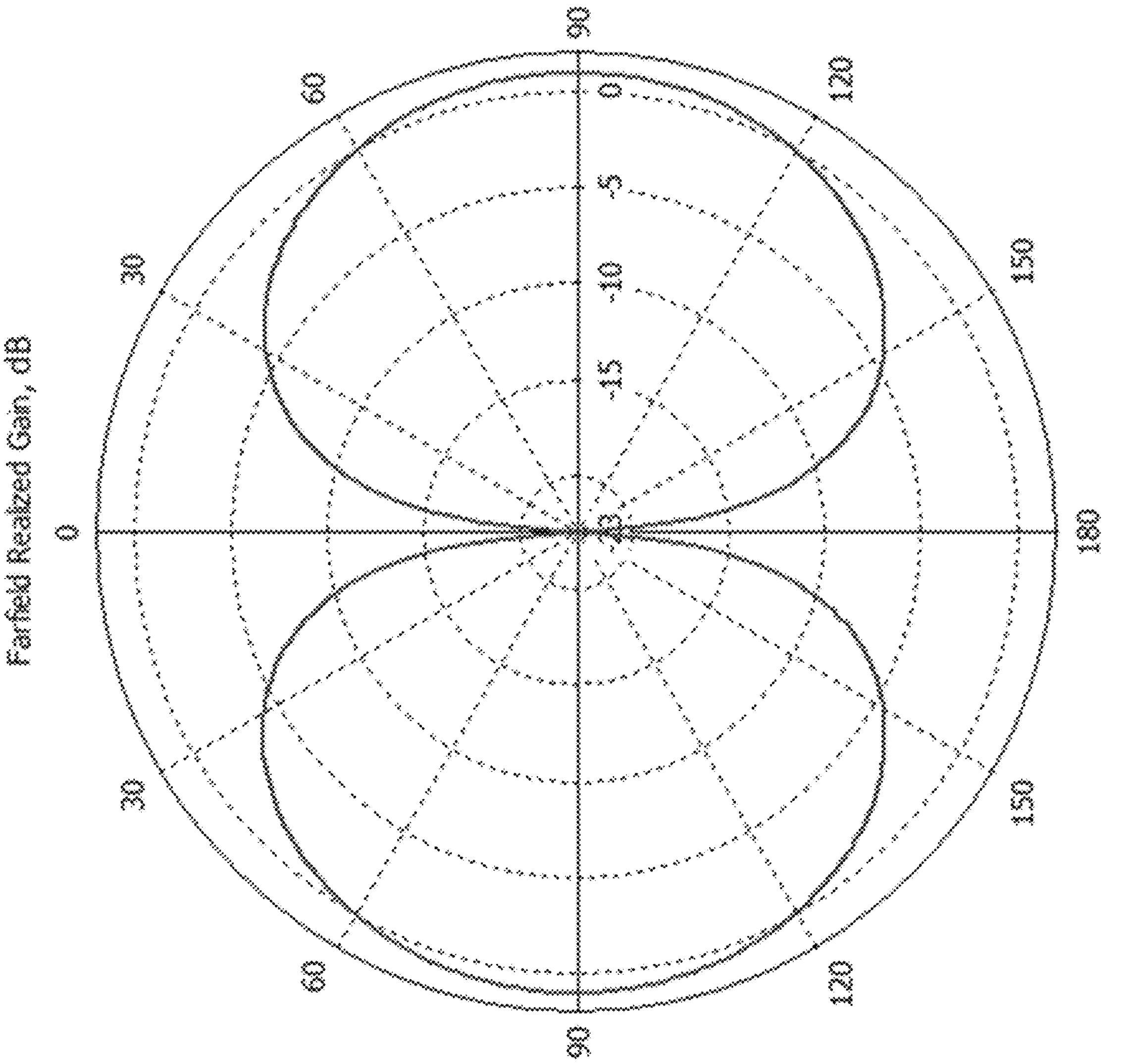

FIG. 14 shows the numerically calculated dependence of the gain of a low-frequency 5G MIMO antenna element in the form of an integrated conical monopole on the elevation angle at a frequency of 960 MHz, which is the highest frequency of the 5G Band n8.

Figure 15:
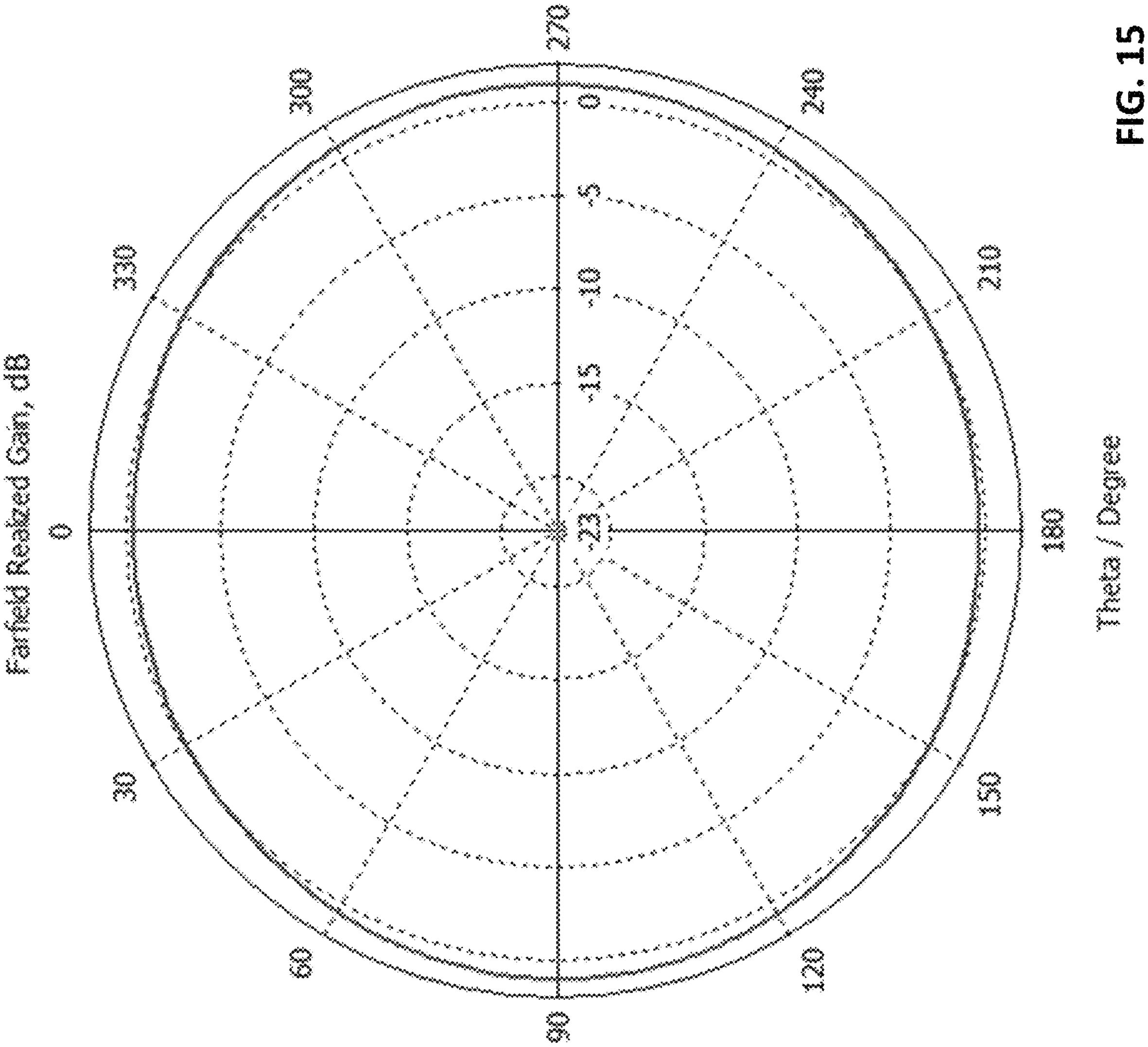

FIG. 15 shows the numerically calculated dependence of the gain of a low-frequency 5G MIMO antenna element in the form of an integrated conical monopole on the azimuth angle at a frequency of 960 MHz, which is the highest frequency of the 5G Band n8.

DETAILED DESCRIPTION OF EMBODIMENTS OF THE INVENTION

Reference will now be made in detail to the preferred embodiments of the present invention, examples of which are illustrated in the accompanying drawings.

The proposed technical solution provides various options of implementing the electrical contact of the monopole and the metal screen in a high-precision GNSS antenna 100, which, for example, can be implemented in the form of a round patch resonator, or in other known forms, is located at the top of the proposed combined GNSS-5G radio system. Possible constructions of GNSS antenna 100 are described in detail in [2], which is incorporated by reference herein in its entirety.

Under the GNSS antenna, a plane-parallel resonator 400 is located, filled with a dielectric or an artificial dielectric, designed to correct the GNSS antenna radiation pattern (see FIG. 1*a*). The plane-parallel resonator may be absent, and in this case, the correction of the GNSS antenna radiation pattern can be carried out by the GNSS antenna itself, which is shown in FIG. 1*b*. A shielded (hollow metal) housing with electronics 200, which is also a conical monopole, and one of the 5G MIMO antenna elements responsible for receiving and transmitting in the 5G low-frequency range (617-960 MHz), is located under the plane-parallel resonator 400. In this case, the top of the cone is directed upwards. The remaining 5G MIMO antennas 300, located under the conical monopole 200 and separated from it by a gap and a metal disk 202, are schematically shown in FIG. 1*a*, 1*b* with curved rectangles.

The design of the housing (conductive cone) with electronics 200 integrated with the conical monopole is shown in more detail in FIG. 2. The housing with electronics 200 is located between two metal disks 201 and 202, and has two conical portions, in this figure a lower one and an upper one with a shallower angle The metal disks 201 and 202 are interconnected by two vertical metal racks 203. The RF cable connecting the GNSS antenna and the housing with electronics 200 is laid in a spiral form 205. The spiral has one or more turns. The shield of the RF cable is soldered to the metal disk 201 and to the housing with electronics 200.

The conical shape with a broken generatrix, which is the form of the housing with electronics 200, in general, can vary widely. The generatrix of the cone does not have to contain a kink, but it is proposed to make a kink to maximize the volume inside the cone occupied by electronics.

As mentioned earlier, the housing with electronics 200 is simultaneously a low-frequency 5G transceiver antenna, which is excited at point 210, located in the center of the upper disk 201. This antenna, due to its relatively large size within the overall device and its conical shape, covers the entire low-frequency 5G band, providing high efficiency at the same time. However, as a part of the 5G MIMO antenna system, the conical monopole works in addition to the other small antennas 300.

Figure 3A:
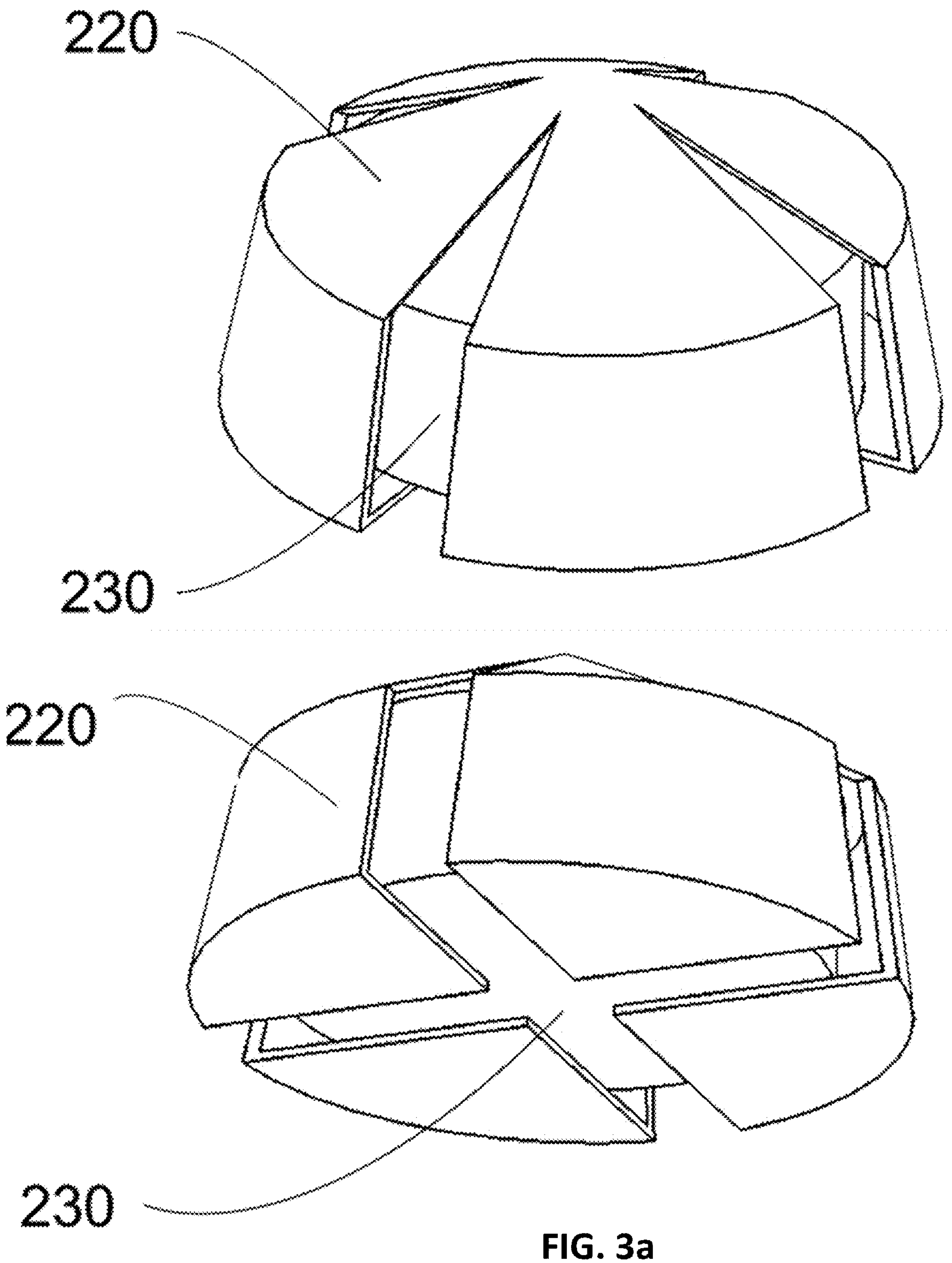
Figure 3B:
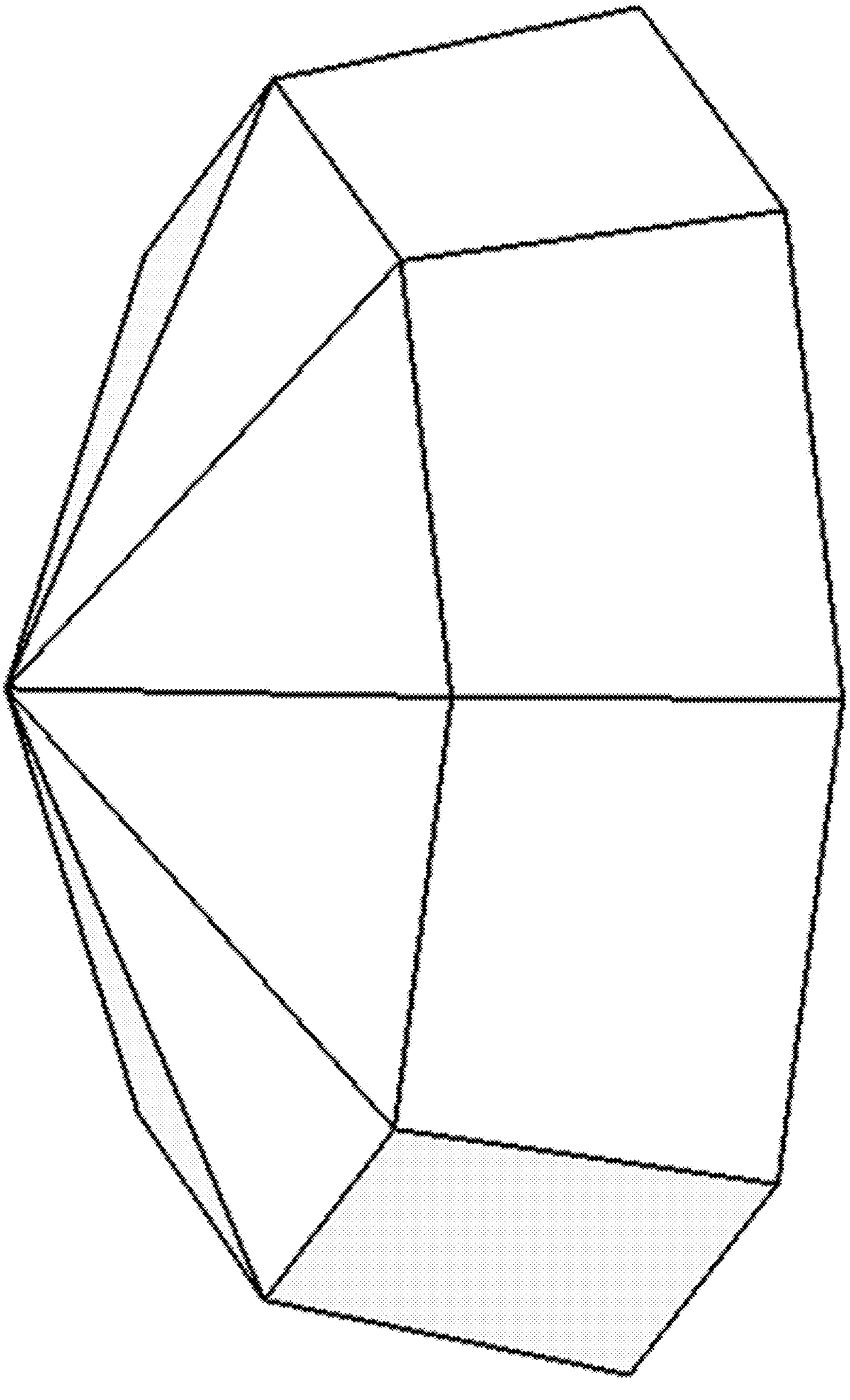
Figure 3C:
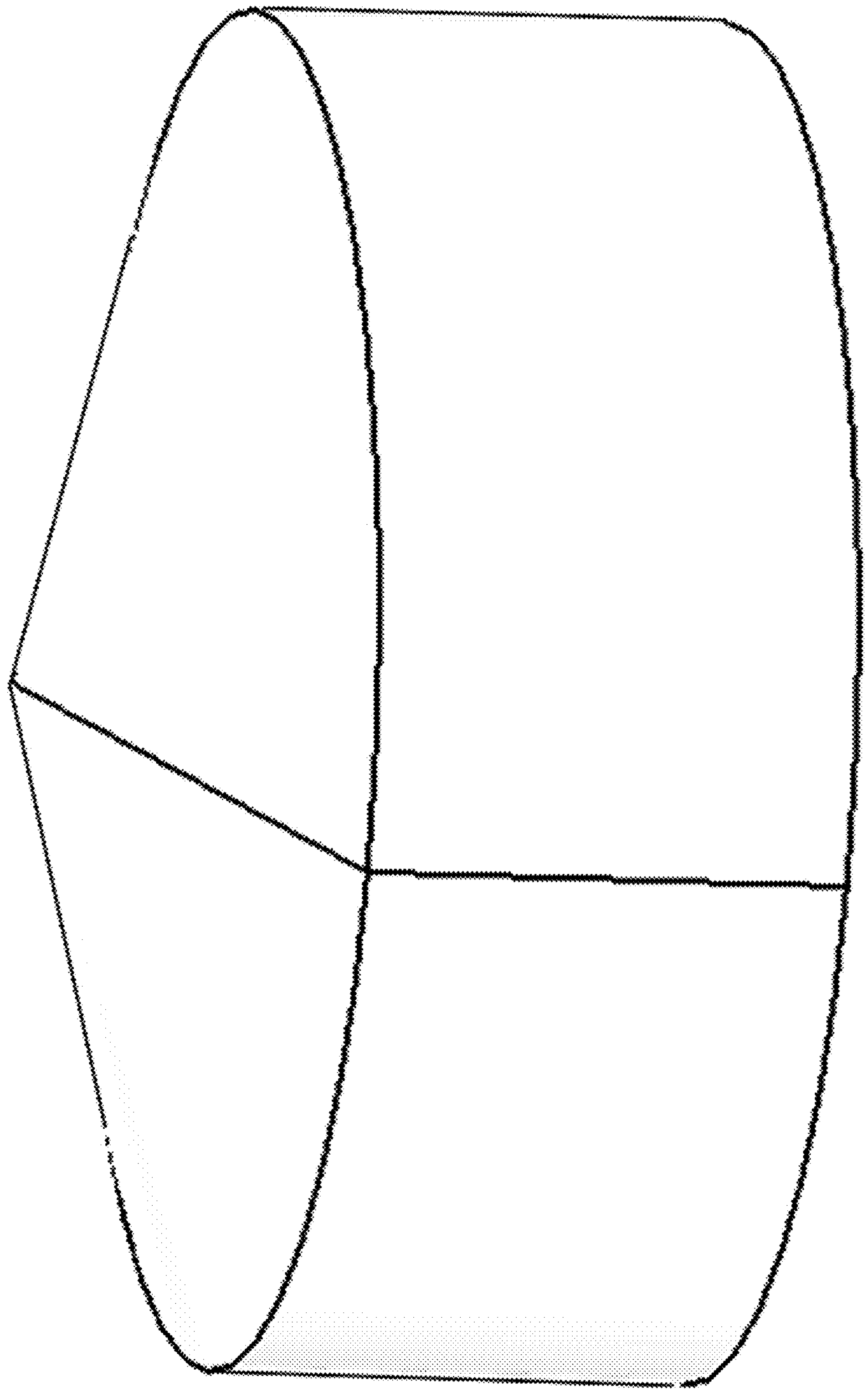
Figure 3D:
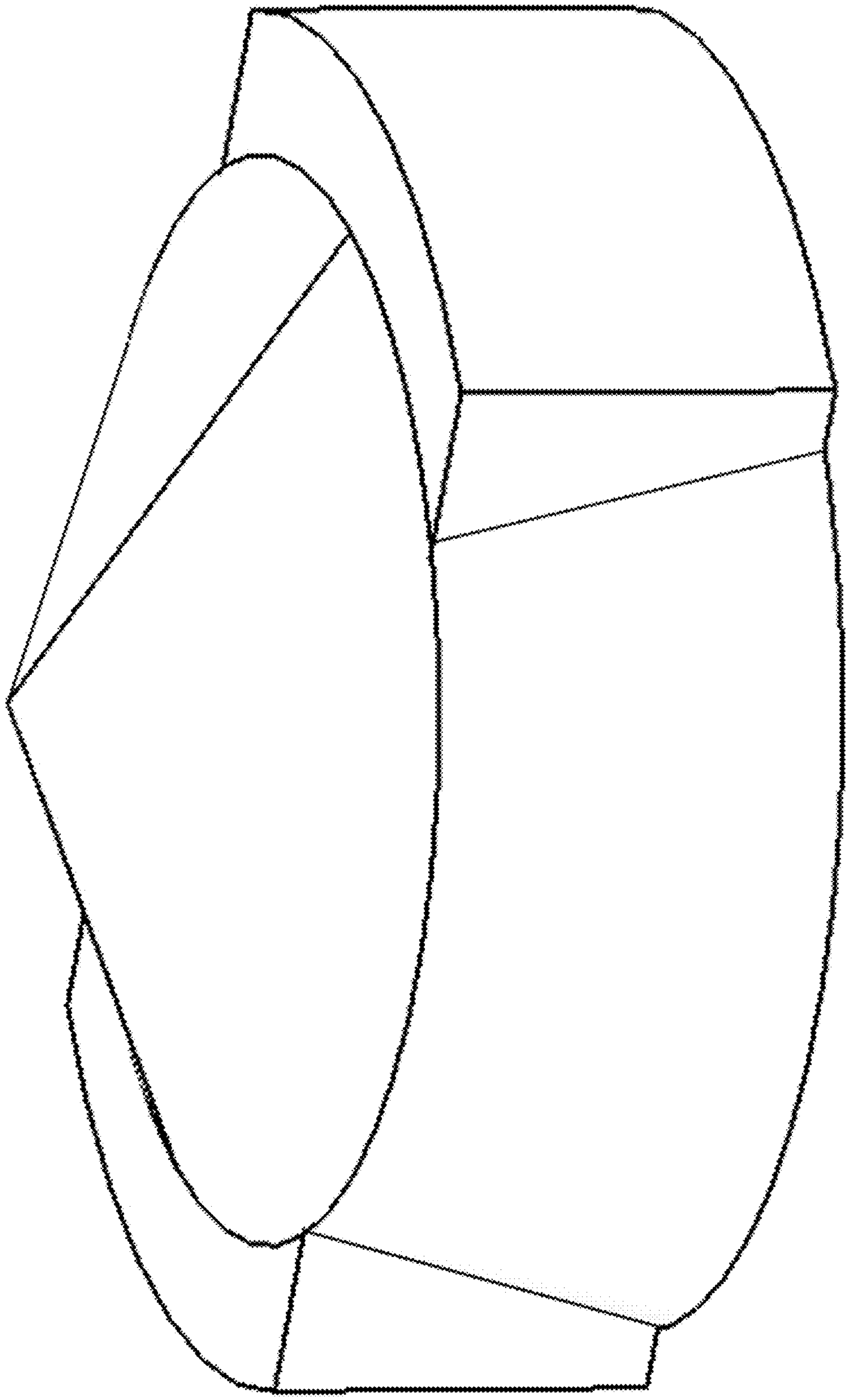

The housing with electronics 200 can be implemented in the form of a "petal" structure 220 and an embedded shielded housing with electronics 230, as shown in FIG. 3*a*, for the convenience of implementing a dismountable design. The total area of cutout in a "petal" structure 220 must be not more than 30% of the total area of a "petal" structure 220. Other cone shapes are possible, they are shown in FIGS. 3*b*-3*d*, e.g., where the lower portion of the cone is made of flat surfaces, resembling a pyramid, the upper portion of the cone is made of flat surfaces, or both. The lower portion can also have lateral projections if additional space for the electronics is needed, as shown in FIG. 3*d*.

Figure 4:
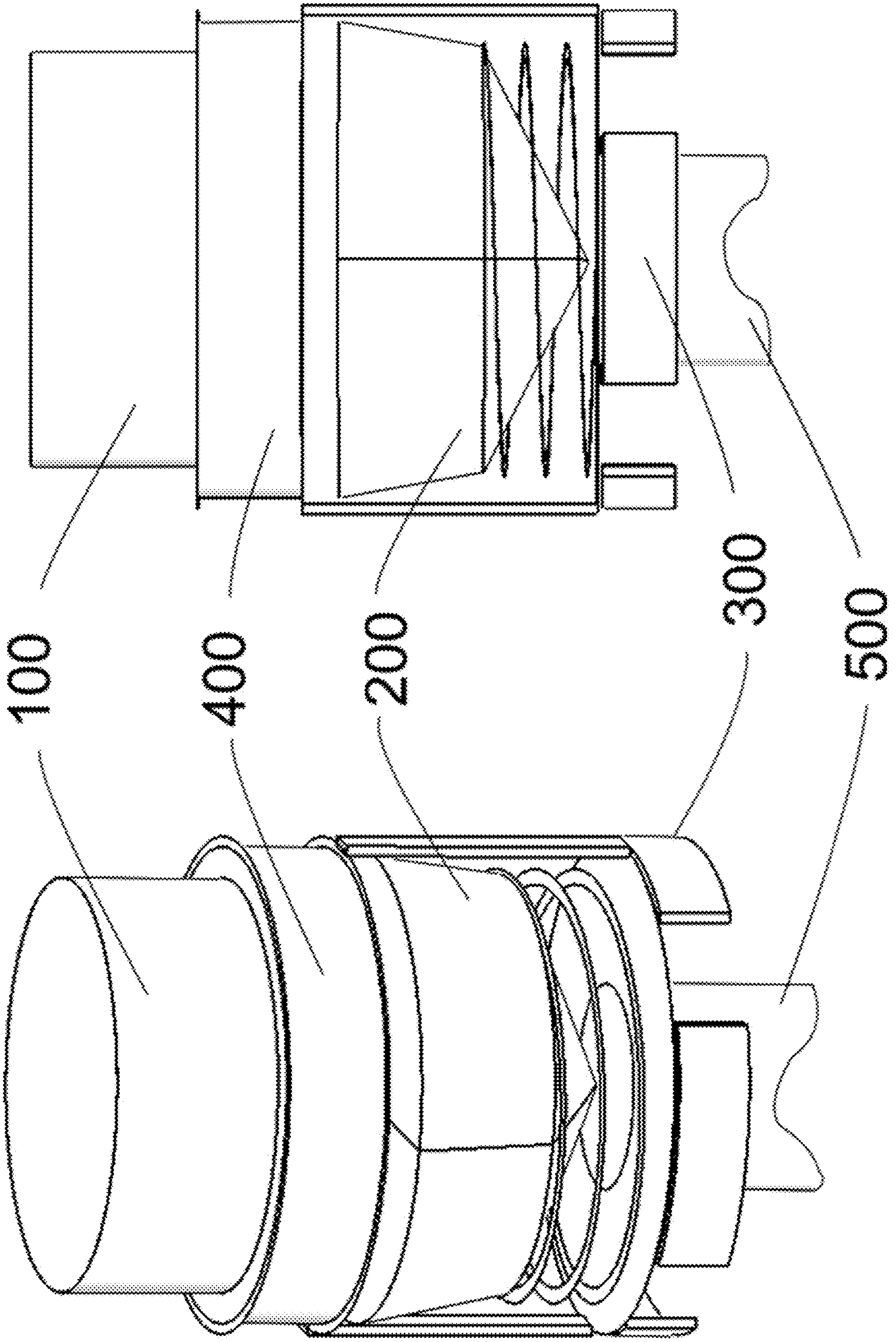

An alternative layout of the housing with electronics 200 is shown in FIG. 4. In the layout shown in FIG. 4, in contrast to the layout shown in FIGS. 1*a*, 1*b*, the housing with electronics 200 is oriented with the base up and the vertex down, and the RF cable connecting it to the GNSS antenna is connected to the metal disk 202, as shown in FIG. 5.

Figure 5:
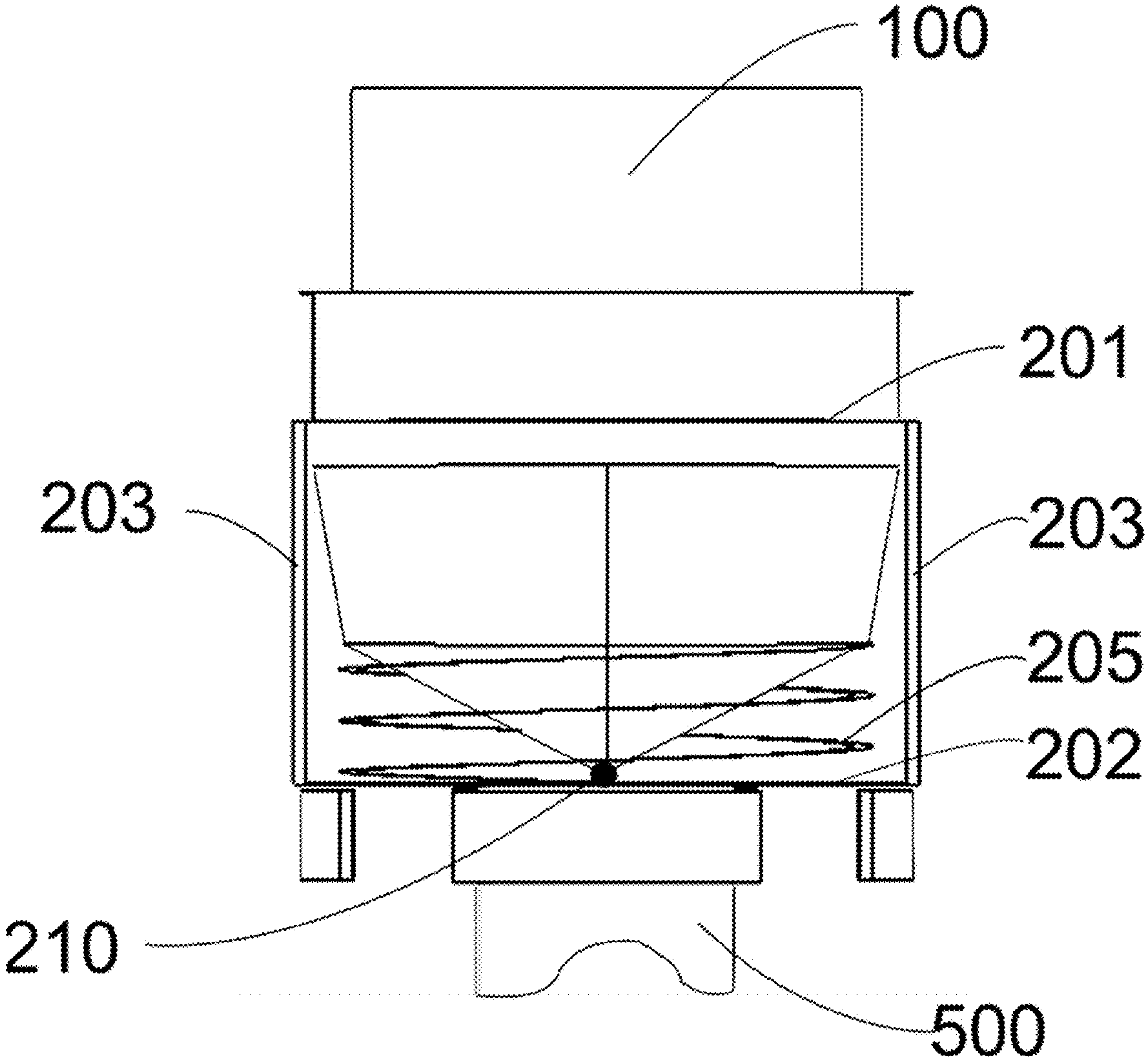
FIG. 5 shows in detail a design of the shielded housing with electronics, which corresponds to the combined design with a low-frequency 5G transceiver antenna element implemented as a conical monopole oriented according to FIG. 4.

The excitation point of the low-frequency 5G antenna formed by the housing with the electronics 200, in the case of the layout according to FIG. 4, is at point 210, which is located, as shown in FIG. 5, in the center of the lower disk 202. In this case, the housing is not galvanically connected to the upper disk 201.

Figure 6:
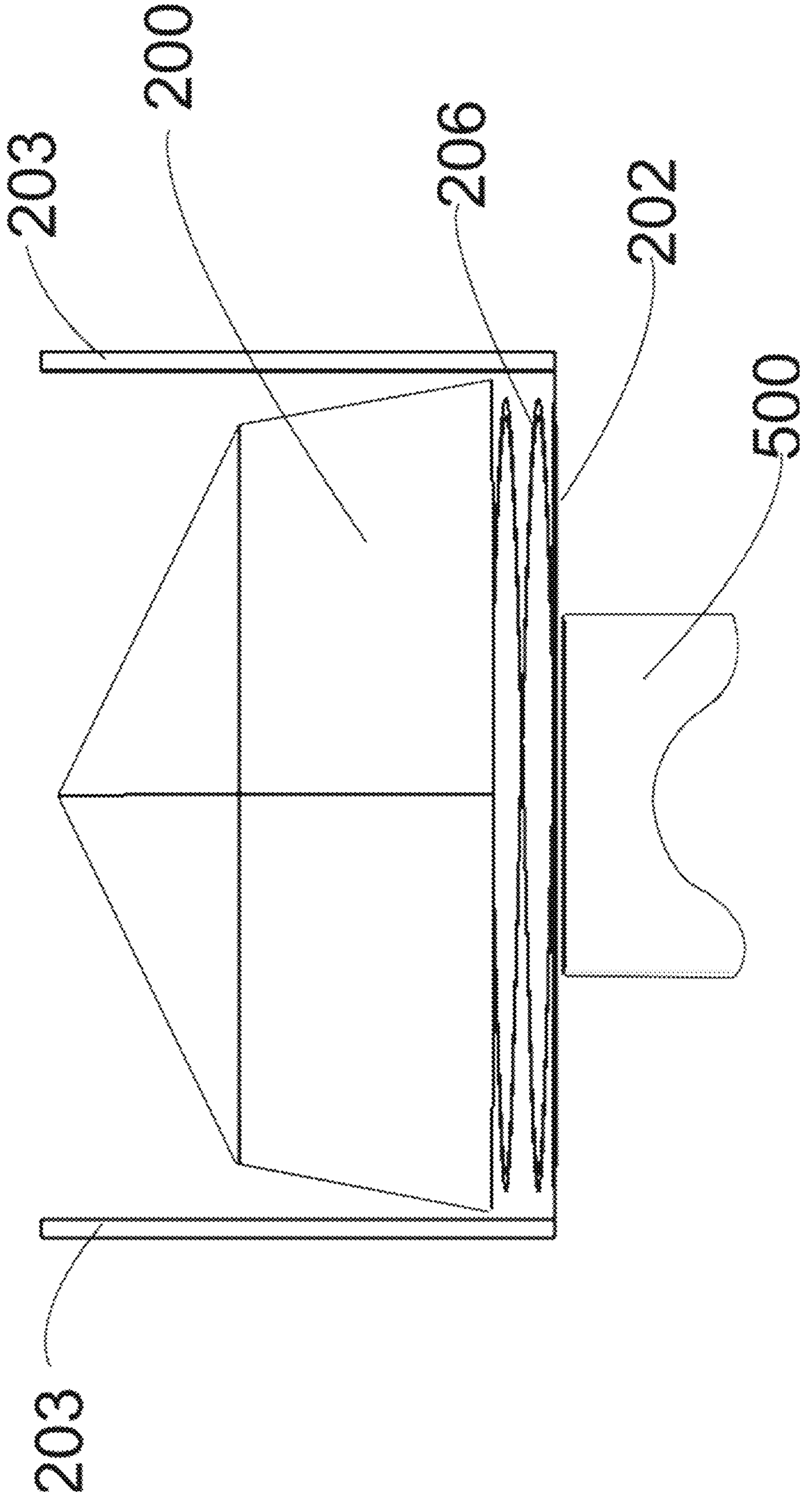
FIG. 6 shows a variant of laying microwave cables in a spiral form to the disk, in which the cables are placed between the wide side of the conical monopole and the disk.

There are also other methods for laying the RF cable from the housing with electronics 200. FIG. 6 shows the RF cables laid in spirals 206 to the disk 202. The spirals have one or more turns. The shield of the RF cable is soldered to the metal disk 202 and to the housing with electronics 200.

FIG. 7 shows a metal stub 207 connecting the metal rack 203 and the housing with electronics 200. The RF cable is laid along the stub 207. The stub 207 is shown schematically. It can be either metallic or dielectric. The shield of the RF cable laid along the dielectric stub must be soldered to the metal rack 203 and to the housing with electronics 200. FIG. 7 shows the typical dimensions of the metal stub 207. The length of a stub 207 Ls1 is equal to 20 to 80 mm. The length of a stub 207 Ls2 is equal to 5 to 70 mm. The width of a stub 207 Ws is equal to 3 to 10 mm. The height of a stub 207 Hs is equal to 10 to 30 mm.

FIG. 8 shows a metal stub 208 connecting the metal rack 203 and the housing with electronics 200. The RF cable is laid along the stub 208. The stub 208 is shown schematically. It can be either metallic or dielectric. The shield of the RF cable laid along the dielectric stub must be soldered to the metal rack 203 and to the housing with electronics 200. FIG. 8 shows the typical dimensions of the metal stub 208. The length of a stub 208 Ls1 is equal to 20 to 80 mm. The width of a stub 208 Ws is equal to 3 to 15 mm.

FIG. 9 shows the exemplary overall dimensions of the integrated 5G and GNSS system. The maximum diameter of the structure d0 is determined by the diameters of the metal disks 201 and 202 and is equal to 80 to 100 mm. The distance h2 between the metal discs 201 and 202 is 50 to 80 mm. The height of the dielectric resonator 400 h3 is 10 to 30 mm. The height of the GNSS patch antenna h1 is 18 to 40 mm.

A possible implementation of the 5G MIMO antenna elements 300 schematically shown in FIG. 1, which are operating in addition to the low-frequency conical monopole 200, is shown in FIG. 10, where the proposed implementations of antennas 300 are designated 310 and 320. Antennas 310 and 320 together cover the following 5G frequency bands: 617-960 MHz, and 1700-6000 MHz.

Antennas 310 belong to the class of PIFA antennas (Planar Inverted F-antenna). Antennas 310 operate in the 5G frequency band of 617-960 MHz. They are located symmetrically with respect to the symmetry axis of the housing and, using the power supply scheme described below, provide decoupling from the main 5G antenna. Antennas 320 are PIFA antennas located around the symmetry axis of the housing on the outer circle of the disk 202. Antennas 320 operate in the 5G frequency range of 1700-6000 MHz. Antennas 320 can be made from a single bent metal segment, or from flat metal components soldered together from metal fragments made using the printed-circuit boards technology. Thus, the proposed antenna system is two-element in the 5G 617-960 MHz band and four-element in the 5G 1700-6000 MHz band. Antennas 320 can be Taoglas PA.176.A antennas, operating in the 5G frequency range of 1700-6000 MHz or antennas described in [3-5], which are incorporated by reference herein in their entirety, or another antennas.

To provide decoupling between the pair of antennas 310 and the low-frequency 5G conical monopole antenna element formed by the housing with electronics 200, the signals at the antennas 310 are summed with a 180 degree phase shift. At the same time, the summed signals from the antennas 310 are fed to a common transceiver channel of the 5G MIMO system, which works together with the channel connected to the conical monopole in the low-frequency 5G band in order to organize a two-element antenna system. A 180 degree shift summation circuit can be implemented using a 180 degree hybrid directional coupler, using a 90 degree hybrid directional coupler with an additional delay line of length λ/4, where λ is the wavelength at the average operating frequency of the range 617-960 MHz, or with a delay line of length λ/2.

To provide decoupling of the antennas 320, including those for transmitting, and the GNSS receiving antenna, the signals on the diametrically opposite antennas 320 are summed in phase.

In terms of design, 5G antennas 310 can be made from either a single metal segment or a thin flexible printed board located near the dielectric base or mounting dielectric racks.

Below are the results of the numerical calculation of the main characteristics of a low-frequency conical monopole antenna element whose orientation corresponds to FIGS. 1*a*, 1*b*. Its main exemplary dimensions, indicated in FIG. 9, are the following: diameter d0 is 95 mm, height h1 is 20 mm, height h2 is 50 mm, and height h3 is 20 mm.

FIGS. 11-15 shows high efficiency of the low-frequency 5G antenna provided by low reflections from its feed points, along with a proper shape of the radiation pattern. The VSWR parameter shown in FIG. 11 indicates a low relative level of reflected waves from the antenna feed point. Lower VSWR corresponds to higher total efficiency of antenna. Because of randomly distributed direction of arrival of the signal, it is better to use an omnidirectional antenna radiation pattern. At the same time, it is beneficial to have a higher antenna gain in the horizon-line directions with respect to the vertical polarization, as it is mostly responsible for operation at far distances from the base station. This is achieved in the proposed antenna as shown in FIGS. 12-15.

FIG. 11 shows the VSWR of a low-frequency 5G antenna versus frequency. From FIG. 11, it can be seen that the VSWR of the antenna does not exceed 3 in the operating frequency range of 617-960 MHz.

FIG. 12 shows the dependence of the vertical polarization gain of a low-frequency 5G antenna on the elevation angle at a frequency of 617 MHz. The value of the antenna gain at the maximum of the radiation pattern corresponding to the horizontal plane is 0 dBi.

FIG. 13 shows the dependence of the vertical polarization gain of a low-frequency 5G antenna on the azimuth angle at a frequency of 617 MHz. It can be seen that the antenna is omnidirectional in the horizontal plane.

FIG. 14 shows the dependence of the vertical polarization gain of a low-frequency 5G antenna on the elevation angle at a frequency of 960 MHz. The value of the antenna gain at the maximum of the radiation pattern corresponding to the horizontal plane is 1 dBi.

FIG. 15 shows the dependence of the vertical polarization gain of a low-frequency 5G antenna on the azimuth angle at a frequency of 960 MHz. It can be seen that the antenna is omnidirectional in the horizontal plane.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention.

REFERENCES (INCORPORATED HEREIN BY REFERENCE IN THEIR ENTIRETY)

1. Mohsen Koohestani, J.-F. Zürcher, Antonio A. Moreira and Anja K. Skrivervik, '*A Novel, Low-Profile, Vertically-Polarized UWB Antenna for WBAN*', IEEE TRANSACTIONS ON ANTENNAS AND PROPAGATION, Vol. 62, No. 4, April 2014
2. Alfred Leick, Lev Rapoport, Dmitry Tatarnikov, *GPS Satellite Surveying*, WILEY (2015).
3. Hassan Tariq Chattha, 4-*Port* 2-*Element MIMO Antenna for* 5*G Portable Applications*, IEEE, Vol. 7 (2019).
4. M. Fakih, A. Diallo, P. Le Thuc, R. Staraj, E. Rachid, O. Mourad, *A Dual-Band PIFA for MIMO Half-duplex* 4*G and Future Full-Duplex* 5*G communication for Mobile Handsets*, IEEE (2018).
5. Da Qing Liu, Ming Zhang, He Jia Luo, Huai Lin Wen, Jun Wang, *Dual-Band Platform-Free PIFA for* 5*G MIMO Application of Mobile Devices*, IEEE, Vol. 66, No. 11 (2018).

What is claimed is:

1. An integrated 5G-GNSS (Global Navigation Satellite System) antenna, comprising:

a GNSS antenna configured to receive GNSS signals from GNSS satellites;

a MIMO (multiple input multiple output) 5G antenna system below the GNSS antenna, the MIMO 5G antenna system comprising (i) a first antenna formed of a conductive cone shaped as a first section and a second section, wherein the first section has a first angle, and the second section has a second shallower or the same angle, with the second section of the conductive cone coming to a vertex point;

(ii) a conductive surface covering an end of the first section that is opposite the second section;

(iii) a plurality of second PIFA (Planar Inverted F-Antenna) antennas extending from the conductive surface, the second PIFA antennas having a curved shape that is aligned with an outer diameter of the first section; and RF (radio frequency) components inside the conductive cone for driving the MIMO 5G antenna system and for receiving the GNSS signals from the GNSS antenna.

2. The integrated 5G-GNSS antenna of claim 1, wherein the conductive cone is oriented upward so that the point is closest to the GNSS antenna.

3. The integrated 5G-GNSS antenna of claim 1, wherein the conductive cone is oriented downward so that the vertex point is furthest from the GNSS antenna.

4. The integrated 5G-GNSS antenna of claim 1, wherein the conductive surface is petal-shaped.

5. The integrated 5G-GNSS antenna of claim 1, wherein the first cone includes two lateral projections.

6. The integrated 5G-GNSS antenna of claim 1, wherein the second 5G antenna further includes a plurality of third PIFA antennas that are L-shaped and that extend from the conductive surface.

7. The integrated 5G-GNSS antenna of claim 1, wherein the RF components are connected using a stub on a surface of the first cone that feeds an RF cable through the first cone to the RF components.

8. The integrated 5G-GNSS antenna of claim 1, wherein the RF components are connected using a spiral around the conductive cone that feeds an RF cable through the point into the conductive cone.

9. The integrated 5G-GNSS antenna of claim 1, wherein the first section is formed of multiple flat surfaces.

10. The integrated 5G-GNSS antenna of claim 1, wherein the second section is formed of multiple flat surfaces.

11. The integrated 5G-GNSS antenna of claim 1, wherein both the first section and the second section are formed of multiple flat surfaces.

12. The integrated 5G-GNSS antenna of claim 1, wherein the GNSS antenna is a round patch resonator.

* * * * *